UNITED STATES PATENT OFFICE.

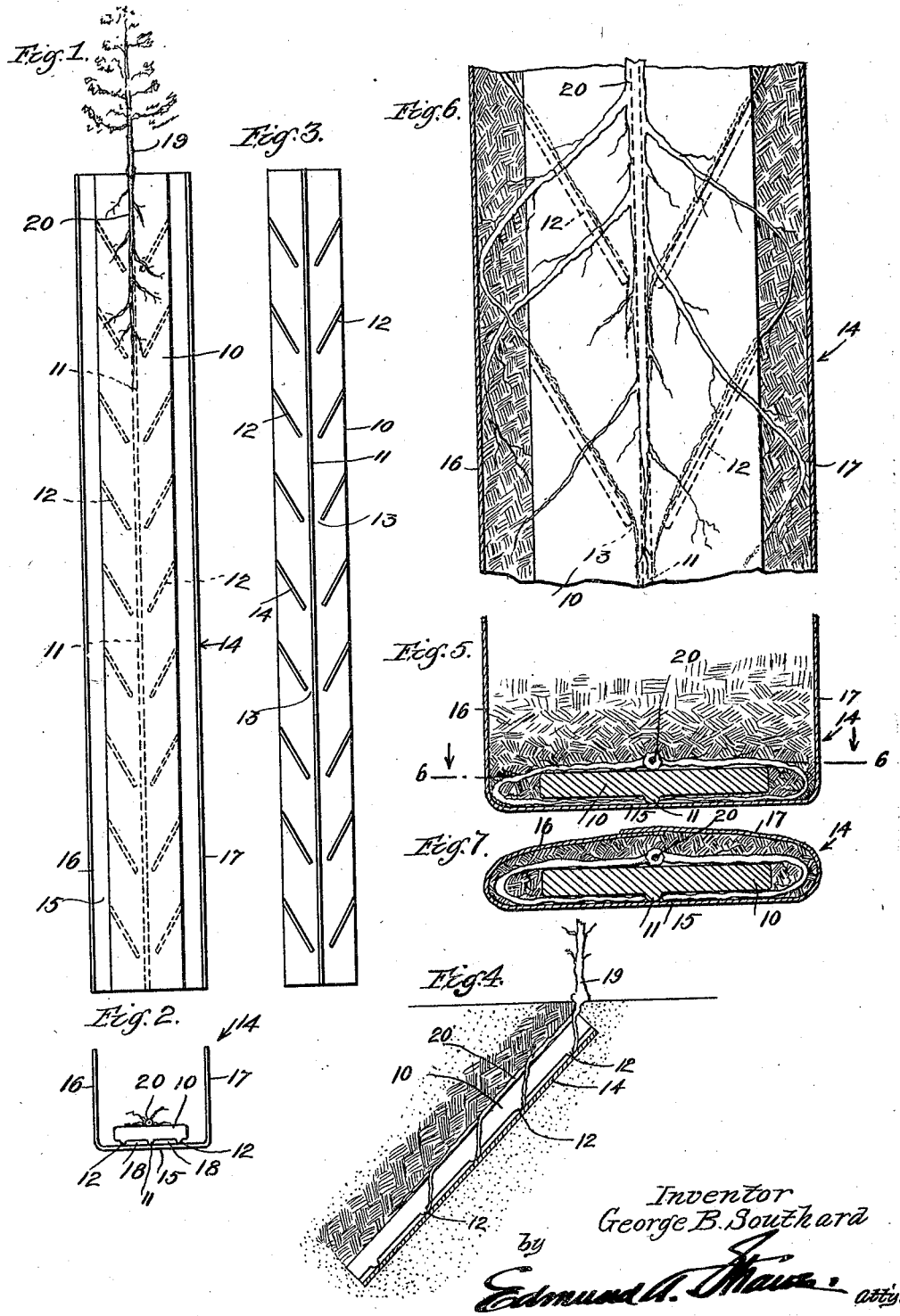

GEORGE B. SOUTHARD, OF LOS ANGELES, CALIFORNIA.

DEVICE FOR CONTROLLING THE GROWTH OF PLANT ROOTS.

1,418,841.	Specification of Letters Patent.	Patented June 6, 1922.

Application filed December 18, 1920. Serial No. 431,593.

*To all whom it may concern:*

Be it known that I, GEORGE B. SOUTHARD, a citizen of the United States, residing at Los Angeles, in the county of Los Angeles and State of California, have invented new and useful Improvements in Devices for Controlling the Growth of Plant Roots, of which the following is a specification.

My invention relates to devices for controlling the growth of plant roots, and is particularly adapted to be used in connection with young trees or plants which are to be ultimately transplanted into an orchard.

In the propagation of trees it is customary to first sow the seed, and after young plants have sprung therefrom, to transplant the same to individual receptacles or to a nursery until they have attained sufficient growth to be set out into an orchard. When the individual receptacles are employed, the roots of the trees become entangled together, and what is known as pot bound, as it is inexpedient and too expensive to provide receptacles of sufficient size to prevent this stunting of the roots. When the young trees are removed from the nursery, especially trees of the citrus and evergreen variety, it is necessary to ball the roots thereof before being transplanted to the orchard. This balling process not only tends to mat the roots together, but involves time, labor and expense.

It is the main object of my invention to overcome the above recited disadvantages and difficulties, by providing a root controlling device which may be buried into the ground or a bank of sand adjacent a young tree, whereby the roots of said tree during their growth will be caused to grow generally in a downward direction, and wrap around, or cling to, said controlling device without the rootlets becoming entangled, in order that said controlling device and tree may be removed simultaneously from the ground or sand, and replanted in the desired place, without appreciably disturbing the roots, or retarding the growth of the tree.

Other objects will be disclosed in the following description, will be pointed out in the claims, and will be embodied in the accompanying drawings, in which:

Fig. 1 is a face view of my device, showing a young tree associated therewith, in a position ready to be inserted into the ground or sand.

Fig. 2 is an underneath plan view of the same.

Fig. 3 is a view showing the opposite side of the root core member.

Fig. 4 is a sectional view through my device, showing the preferred manner of imbedding the same in the earth or a sand bank, and the manner in which the roots of the young tree are directed to cling to the core member.

Fig. 5 is an enlarged transverse section through my device, as it would appear when removed from the ground, with the tree roots engaged therewith.

Fig. 6 is a fragmental section, taken on the line 6—6 of Fig. 5 also showing the growth of the tree roots with respect to my device.

Fig. 7 is a transverse section similar to Fig. 5, showing the device and accompanying tree in readiness for transportation to the orchard for permanent planting.

In carrying out my invention, I employ a core member 10, which is preferably formed of a slab of wood or any other material which will eventually become distintegrated, or rot, when buried in the ground, and in cross section of any desired shape. One of the faces of core member 10 is preferably left smooth, and the opposite face thereof is provided with a centrally disposed longitudinal rib 11, and a plurality of ribs 12 which extend from the outer edges of said core member inwardly and downwardly, but do not join with the rib 11, thus leaving spaces 13 between the inner ends of ribs 12, and the rib 11. The ribs 11 and 12 are preferably formed of tar pitch, more or less of a rough nature, in order that the rootlets of a growing plant will tend to cling to them.

The core member is placed in a casing member 14, which is preferably composed of some flexible and disintegrable material such as tar paper, and formed in the shape of a trough having the bottom 15, and the side members 16 and 17.

The ribbed surface of core member 10 abuts against the bottom 15 of casing member 14, thus forming interstices 18 between said bottom and the under surface of core member 10, into which soil may have been previously placed if so desired.

The young seedling tree 19, is arranged adjacent the smooth surface of core member 10, as shown in Fig. 1, with the main root 20 depending downwardly with respect to the ribs 12, and the trunk of the tree projecting beyond the top of said core member. Soil is then filled into the casing member 14, over the root 20, and over and around the sides of the core member 10.

After the device with accompanying tree has been prepared as above described, it is placed in a bank of sand at an angle of any desired degree, as shown in Fig. 4 of the drawings. As the root and rootlets grow, the main roots tend to follow along the surface of core member 10 and the rootlets will tend to spread outwardly and downwardly around the edges of said core member, and when the ends thereof reach the inner surface of the bottom 15 of casing 14, they will be diverted into the interstices 18 and guided inwardly and downwardly by the ribs 12, and when they reach the rib 11, will be prevented thereby from crossing over to the opposite edge of core member 10, as more clearly shown in dotted lines in Fig. 6 of the drawings. Thus it will be seen that the roots and rootlets will be always directed in a natural downward direction to encompass the core member 10, and will be effectually prevented from becoming matted or entangled together.

It will be seen from the foregoing description of my invention that when it is desired to transplant the tree to its permanent location, it will be only necessary to remove the device from the bank and scrape some of the earth from out of casing 14, and then fold the sides 16 and 17 of casing 14 over, as shown in Fig. 7 of the drawings. It will be obvious that this operation may be accomplished without disturbing the tree roots, and the tree may be conveniently transported to its final destination and replanted without retarding its growth.

In the course of time, after the tree has been permanently planted, the casing 14 and core 10 will rot and become disintegrated and thus afford a fertilizer for the tree roots, as well as permitting them to spread out in a natural and healthy manner.

What I claim is:

1. A device of the class described, comprising a core member adapted to be placed in the ground adjacent a plant, and means for causing the roots of said plant to cling to said core member, during their growth.

2. A device of the class described, comprising a core member adapted to be placed in the ground adjacent a plant, and means for causing the roots of said plant to wind around said core without becoming entangled with one another during their growth.

3. A device of the class described, comprising a core member adapted to be placed in the ground adjacent a plant, and means for causing the roots of said plant to wind around said core member and the root ends to grow in substantially a downward direction.

4. A device of the class described, comprising a core member formed of disintegrable material provided with a plurality of downwardly and inwardly projecting ribs, and a casing member associated with said core member.

5. A device of the class described, comprising a core member formed of disintegrable material provided on one of its surfaces with a centrally disposed rib and a plurality of ribs extending from the outer edges thereof inwardly and downwardly, but not connecting with said centrally disposed rib, and a disintegrable and flexible casing arranged adjacent the ribbed surface of said core member.

In witness that I claim the foregoing I have hereunto subscribed my name this first day of December, 1920.

GEORGE B. SOUTHARD.